H. T. HALLOWELL.
SHAFT COLLAR.
APPLICATION FILED AUG. 1, 1908.
1,004,875.
Patented Oct. 3, 1911.
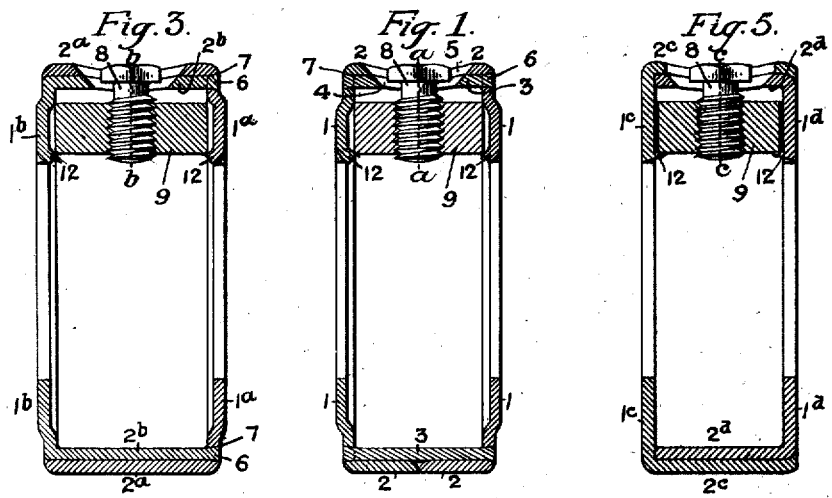
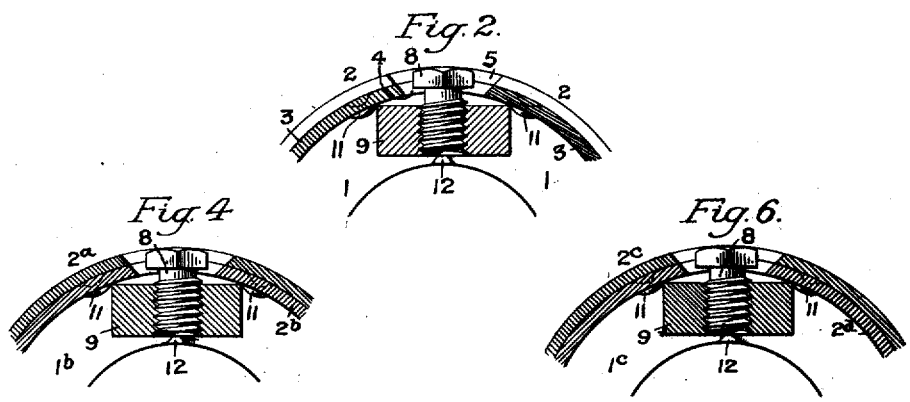
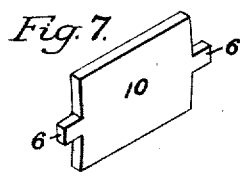
WITNESSES:
Walter R. Pullinger
Walter Chism
INVENTOR:
Howard T. Hallowell
by his Attorneys.
Howson & Howson

UNITED STATES PATENT OFFICE.

HOWARD T. HALLOWELL, OF PHILADELPHIA, PENNSYLVANIA, ASSIGNOR TO STANDARD PRESSED STEEL COMPANY, OF PHILADELPHIA, PENNSYLVANIA, A CORPORATION OF PENNSYLVANIA.

SHAFT-COLLAR.

1,004,875.  Specification of Letters Patent.  Patented Oct. 3, 1911.

Original applications filed March 20, 1908, Serial Nos. 422,317 and 422,318. Divided and this application filed August 1, 1908. Serial No. 446,478.

*To all whom it may concern:*

Be it known that I, HOWARD T. HALLOWELL, a citizen of the United States, residing in Philadelphia, Pennsylvania, have invented certain Improvements in Shaft-Collars, of which the following is a specification.

My invention relates to the construction of an annulus, such as a shaft collar; and the object of my invention is to form a shaft collar of a plurality of sheet metal members pressed into the desired shape and so constructed as to maintain in proper position a suitable nut or other support through which a set screw is passed for normally retaining such annulus or collar in place upon a shaft or other similar element.

My present invention, which is a division of my applications for patents filed March 20, 1908, Serial Nos. 422,317, and 422,318, refers more particularly to structures secured together by riveting one portion of the same with respect to another, although as will be readily understood, other means of securing the sections in proper relative position may be employed and are within the scope of my invention.

My invention is fully shown in the accompanying drawings, in which:

Figure 1, is a vertical sectional view of one form of shaft collar made in accordance with my invention; Fig. 2, is a cross sectional view of the same, taken on the line *a—a*, Fig. 1; Figs. 3 and 5, are sectional views of the same character as Fig. 1, illustrating modifications embodying my invention; Figs. 4 and 6, are sectional views, taken on the lines *b—b* and *c—c*, respectively, of Figs. 3 and 5, and Fig. 7, is a view illustrating a detail of my invention.

All the structures forming the subject of my invention comprise sections or blanks of sheet metal pressed into shape to form an annular member with shaft engaging portions; the side walls of the members forming the collar having circular apertures for the passage of the shaft, and the edges of the walls in which said apertures are formed engage said shaft. The several sections of the collar are so disposed as to provide mutual connection and support, and portions of the metal comprising one or more of the same are displaced at the necessary points so as to confine in proper relative position a suitable nut for the set screw employed with such collars.

In the structure shown in Figs. 1 and 2, I provide a pair of members having in cross-section an L-shaped contour which are combined to form an annulus or collar. These sections have side walls 1, which may or may not be offset, and outer peripheral walls or flanges 2. In order to secure this collar together, I provide an annular band or sleeve 3 disposed inside the sections forming the collar and lying against the outer peripheral wall of the collar; such band or sleeve being apertured at 4 for the passage of a set screw 8 and counterbored to accommodate the head of the same, in line with a similar aperture in the peripheral walls or flanges of the sections formed by the registering notches 5 therein.

In order to confine the sections in position by said sleeve, the latter may be provided with spuds 6 arranged to enter apertures 7 in the side walls 1 of the sections and be riveted thereto, in the manner clearly shown in the drawings; such action binding the sections together and holding them against displacement. If desired, the band or sleeve 3 may be brazed, electrically welded, or otherwise permanently secured to the sections. In the present instance, the sections of the collar have their sharp corners rounded or beveled. The securing sleeve 3 may be formed into the necessary shape from a flat strip, the meeting edges of which abut, and they may or may not be secured by brazing, welding, or other desirable means. Instead of employing an annular band or sleeve 3 as shown in Figs. 1 and 2, I may use small plates 10 such as illustrated in the perspective view, Fig. 7, for the purpose of securing the sections of the collar together, or rivets of the ordinary type may be employed.

Instead of spuds passing entirely through the side walls to be riveted on the outside of the same, they may only touch said side walls, and the edges of the inner band may be electrically welded by means of slight raised contact points or projections similar to spuds, but of smaller proportions. The nut or support 9 through which the set screw passes is laid adjacent the sections forming the collar during the process of finally securing the same together, and to retain this nut in place, I may provide various means, such for instance as displacing the metal of the walls of the sections forming the shell by suitable means, as clearly shown at 11 and 12 in the several views of the drawings, the screws being broken away in Figs. 2, 4 and 6, to clearly show the projections 12.

In Figs. 3 and 4, I have shown a structure comprising a pair of L-shaped sections, each having side walls 1$^a$ and 1$^b$ and outer peripheral walls 2$^a$ and 2$^b$, one of said sections being less in diameter than the other so that it may enter the larger section and be suitably secured thereto. As shown in the drawings, such securing is accomplished by means of spuds 6 projecting from the edge of the peripheral wall 2$^b$ of the inner member and arranged to pass through apertures 7 in the side wall 1$^a$ of the other member adjacent its peripheral wall. It will be understood, however, that the sections may be secured by brazing, welding, or other suitable means. This form of structure will be provided with a nut in the same manner as the other forms, and the peripheral wall of the collar formed by the several peripheral walls of the sections will be provided with the counterbored aperture for the head of said set screw. To hold the nut in place, the peripheral wall of the inner section will have struck-up portions as indicated at 11, while the side walls will be struck-up in the manner indicated at 12, underlying the nut and preventing radial movement of the same.

In Figs. 5 and 6, I have shown a structure somewhat similar to that shown in Figs. 3 and 4, except that the inner section is secured by slightly turning over the edge of the peripheral wall 2$^c$ of the outer section against the side wall 1$^d$ of the inner section. The nut will be held in place in precisely the same manner as the structure shown in Figs. 3 and 4, and the inner edge of the peripheral flange 2$^d$ or wall of the inner section or member may be brazed, electrically welded, or otherwise secured to the side wall 1$^e$ of the outer section or member.

In completing the annulus or shaft collar, the members of the same are assembled in a suitable manner; the nut being properly positioned and maintained in such position by means of the set screw, or a suitable pin, which is passed through the apertures of the several members and then the members are riveted together, the nut having been positioned by displacing the metal of the annular band or the peripheral wall of one of the members relatively thereto, in the manner described.

I may, if desired, in addition to the riveting, braze or electrically weld any and all of the abutting faces of the several forms of structures shown herein, and I may further harden the side wall or face of the respective collars which comes opposite the work. In all instances the strip used as the inner securing collar or sleeve may be made of flat metal with its abutting ends brazed or not as desired, and while the outer securing sleeves may also be made of such metal, the abutting edges of the same are preferably brazed.

It may be desirable to provide nuts with curved upper faces to fill the space above the same under the peripheral wall, such for instance as shown in my companion case filed herewith. The apertures in the outer wall of the collar receiving the set screws are preferably countersunk or bored to accommodate the heads of the set screws so that the latter will not project radially beyond the peripheral face of the same.

I claim:

1. The combination, in a sheet metal shaft collar, of a plurality of sections L-shaped in cross section, each comprising a side wall and an outer annular or peripheral wall, the side walls of said structure being apertured for the passage of a shaft and each presenting a narrow annular edge for engagement with the shaft when the collar is applied thereto, means for securing said sections together, a nut disposed in the space formed by the walls of said sections, and a set screw mounted in said nut, said side walls having struck-up portions directly adjacent the shaft opening underlying and supporting said nut.

2. In a sheet metal shaft collar, the combination of a pair of L-shaped members each having a side wall and an outer peripheral wall or flange with the edges of said latter walls abutting, confining means disposed within said collar to which the sections are riveted, said confining means lying against the outer walls or flanges of the sections and forming with the same the peripheral wall of the collar, a nut disposed between the side walls of the structure, and a set screw therefor, said side walls being apertured for application to a shaft and each presenting a narrow annular edge for engagement with the shaft when the collar is applied thereto with portions struck up from side walls directly adjacent the shaft opening to underlie and support the nut, and the outer annular or peripheral wall of the collar having an enlarged aperture to accommodate the head of the set screw.

In testimony whereof, I have signed my name to this specification, in the presence of two subscribing witnesses.

HOWARD T. HALLOWELL.

Witnesses:
MURRAY C. BOYER,
JOS. H. KLEIN.